May 31, 1927.
C. LEONE
1,630,951
AUTOMOBILE SAFETY FENDER
Filed March 26, 1925
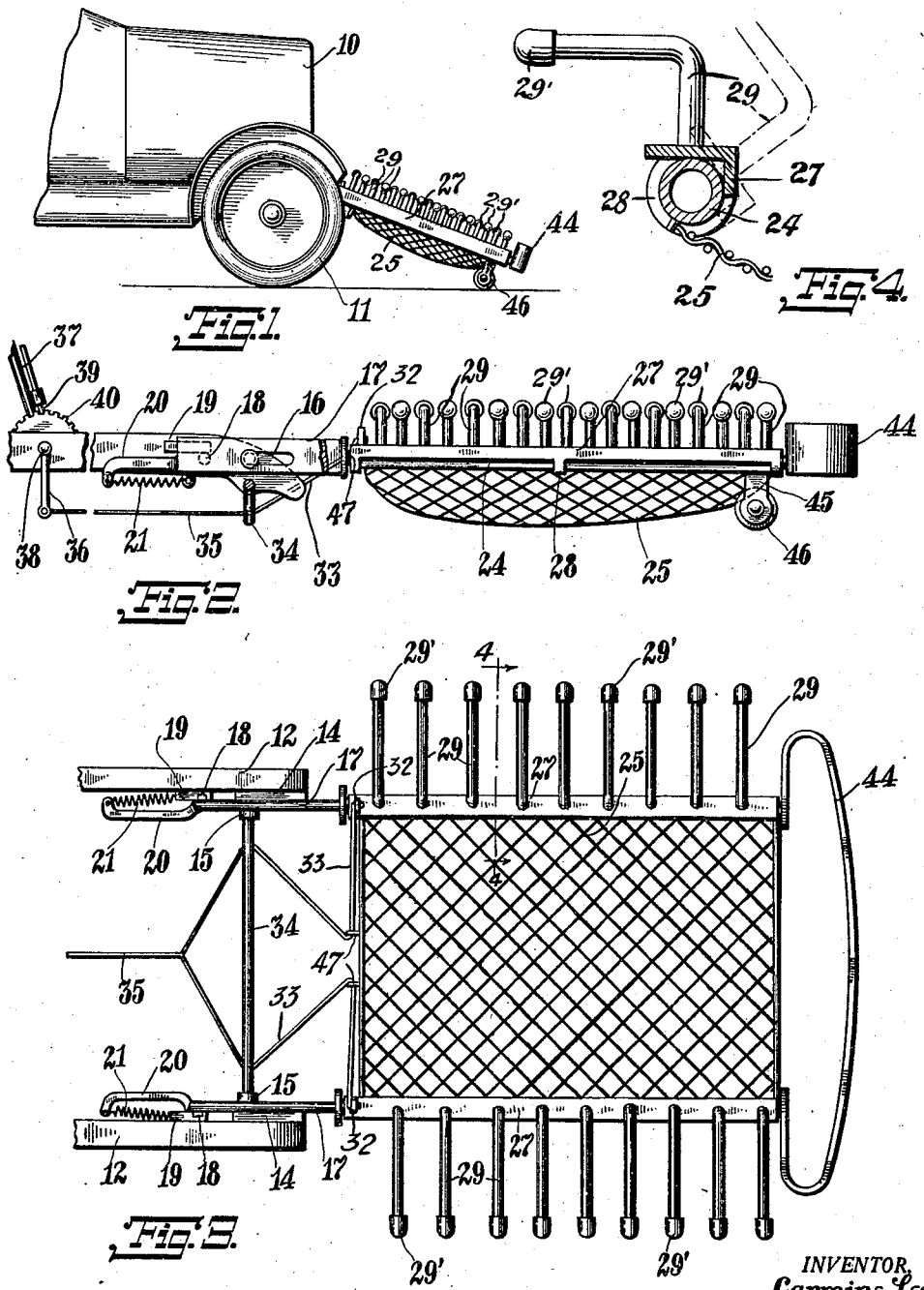
INVENTOR
Carmine Leone
BY 
ATTORNEYS.

Patented May 31, 1927.

1,630,951

UNITED STATES PATENT OFFICE.

CARMINE LEONE, OF WALTHAM, MASSACHUSETTS.

AUTOMOBILE SAFETY FENDER.

Application filed March 26, 1925. Serial No. 18,392.

This invention relates to a safety fender for automobiles, the invention having for an object to provide a novel and simple form of safety fender, which will pick up a person struck, and retain the said person on the fender, eliminating danger of the person falling or rolling off the fender in front of the wheels.

For further comprehension of the invention, and of the objects and advantages thereof, reference will be had to the following description and accompanying drawing, and to the appended claims in which the various novel features of the invention are more particularly set forth.

Fig. 1 of the drawing is a side view showing my improved fender applied to an automobile, and in lowered position.

Fig. 2 is a part side view and longitudinal sectional view showing the fender in raised position.

Fig. 3 is a plan view of the fender.

Fig. 4 is a detail transverse sectional view taken on the line 4—4 of Fig. 3.

In the drawing the reference numeral 10 indicates the body of an automobile, one of the front wheels being shown at 11 and the front portions of the usual side frame members of the chassis at 12. According to my invention I attach to the front ends of the members 12 the blocks 14 that have fixed therein the headed pins 15, these pins passing freely through longitudinal slots such as 16 in a pair of flat bars 17 that form the rear ends of the side arms of the fender frame. Fixed in these bars 17, behind the slots 16, are pins such as 18 that normally project under retaining ribs 19 on the frame members 12 to hold the fender in raised position. These bars 17 have rearwardly extending fingers or rods 20 to each of which a tension spring 21 is attached at one end, these springs leading forwardly to connect to the frame members 12 at their other ends.

The bars 17 have fixed to their forward ends, in alinement therewith, the tubular rods 24 that form the side arms of the fender, and which have connected thereto, in any suitable manner, a net 25 that forms the body of the fender and which stretches between the said rods 24. Rotatably mounted on these rods 24 are the parti-tubular members 27 that extend from end to end of the said rods and are secured against lateral displacement from the rods by means of the loops 28 extended from the sides thereof to surround the rods 24. These members 27 have attached thereto a series of curved fingers 29 that normally project upwardly and outwardly therefrom, as shown in full lines in Fig. 4 of the drawing, but which are adapted to be swung inward to the position shown in dotted lines in Fig. 4, to embrace the person caught by the fender and prevent the said person falling therefrom. To enable these fingers 29 to be so swung each of the members 27 has attached to its rear end a laterally projecting arm 32 these arms having attached thereto the cords or wires 33 that pass through suitable guide eyes at 47 and in 34 and unite in a single cord or wire 35 that leads rearwardly to connect to a crank member 36 rigid with a lever 37 fulcrumed as at 38 to one of the side frame members 12, this lever having a manually operable locking bolt 39 thereon that cooperates with the usual segmental keeper 40.

The rods 24 have attached to their forward ends the ends of a resilient bumper bar 44, and have also fixed thereto, near the said forward ends, depending brackets such as 45 in which rollers 46 are mounted, these rollers engaging the ground when the fender is lowered to operative position.

In the use of my improved fender, when the latter is struck, it slides rearwardly a short distance until the pins ride off the ribs 19, when the fender swings downward by gravity until the rollers 46 rest on the ground. The driver of the automobile may then move the lever 37 to pull on the cords 33 and thereby rock the members 27 and cause the fingers 29 to be swung over the person caught in the fender. These fingers may have rubber pads 29' on their ends to avoid danger of injury to the person in the fender.

Having thus described my invention, what I claim as new and desire to protect by Letters Patent of the United States is as follows:

1. An automobile fender comprising a frame, a net supported therefrom, a series of fingers movably carried by the said frame, and means for swinging the said fingers transversely across the net, including parti-tubular rock members mounted on said frame and having the said fingers attached thereto.

2. An automobile fender comprising a frame consisting of a pair of side rods, a net attached to said side rods, parti-tubular rock members extending along said rods and partially surrounding the same, rows of fingers projecting from said rock members, and means for swinging said rock members to cause said fingers to project across the said net.

3. An automobile fender comprising a frame consisting of a pair of side rods, a net attached to said side rods, parti-tubular rock members extending along said rods and partially surrounding the same, rows of fingers projecting from said rock members, and means for swinging said rock members to cause said fingers to project across the said net, said fingers having rubber pads on their free ends.

4. An automobile fender comprising a frame consisting of a pair of side rods, a net attached to said side rods, parti-tubular rock members extending along said rods and partially surrounding the same, rows of fingers projecting from said rock members, and means for swinging said rock members to cause said fingers to project across the said net, said means comprising arms fixed to the said rock members, a lever adapted for manual operation, and cords connecting the said arms with the said lever.

5. An automobile fender comprising frame consisting of a pair of side rods, a net attached to said side rods, parti-tubular rock members extending along said rods and partially surrounding the same, rows of fingers projecting from said rock members, and means for swinging said rock members to cause said fingers to project across the said net, means mounting said frame on the automobile to permit of vertical swinging movement and of rearward movement, means normally retaining the said frame in horizontal position, said last means being releasable upon rearward movement of the said frame.

In testimony whereof I have affixed my signature.

CARMINE LEONE.